(12) United States Patent
Widmann et al.

(10) Patent No.: US 12,188,199 B2
(45) Date of Patent: Jan. 7, 2025

(54) DRIVE DEVICE FOR A DIAPHRAGM WALL CUTTER

(71) Applicant: Liebherr-Components Biberach GmbH, Biberach an der Riss (DE)

(72) Inventors: Roland Widmann, Unlingen (DE); Johannes Halder, Ertingen (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 699 days.

(21) Appl. No.: 17/446,265

(22) Filed: Aug. 27, 2021

(65) Prior Publication Data

US 2021/0404140 A1 Dec. 30, 2021

Related U.S. Application Data

(63) Continuation of application No. PCT/EP2020/054358, filed on Feb. 19, 2020.

(30) Foreign Application Priority Data

Feb. 27, 2019 (DE) ..................... 20 2019 101 110.6
May 2, 2019 (DE) ..................... 20 2019 102 477.1

(51) Int. Cl.
*E02F 3/20* (2006.01)
*E02D 17/13* (2006.01)
(Continued)

(52) U.S. Cl.
CPC .............. *E02F 3/205* (2013.01); *E02D 17/13* (2013.01); *E02F 3/246* (2013.01); *E02F 3/26* (2013.01)

(58) Field of Classification Search
CPC ... E02F 3/205; E02F 3/246; E02F 3/26; E02F 3/248; E02F 3/188; E02F 5/14;
(Continued)

(56) References Cited

U.S. PATENT DOCUMENTS 6,626,500 B1 * 9/2003 Cribb ..................... E02F 3/205
299/41.1
2006/0053665 A1 * 3/2006 Arzberger ............... E02D 17/13
37/352
2008/0296959 A1 * 12/2008 Chagnot ................. E02F 3/205
299/79.1

FOREIGN PATENT DOCUMENTS

CN 106286780 1/2017
DE 2162314 11/1972
(Continued)

Primary Examiner — Thomas B Will
Assistant Examiner — Robert E Pezzuto
(74) Attorney, Agent, or Firm — Levine Bagade Han LLP

(57) ABSTRACT

A drive device for a diaphragm wall cutter, having a drive housing and/or gear housing, which encloses an interior for accommodating drive and/or gear elements and comprises two housing parts which are rotatable relative to one another and sealed off from one another by a sealing device, and having a pressure equalization device for pressure equalization between the interior and the surroundings. A diaphragm wall cutter having such a drive device. The pressure equalization device comprises at least one intermediate chamber, which is pressurized and is sealed off from the interior by an inner seal and off from the surroundings by an outer seal. By virtue of such a sealed intermediate chamber that can be considerably smaller in terms of volume than the interior, the pressurization for pressure equalization between interior and surroundings is considerably simpler.

26 Claims, 4 Drawing Sheets

(51) Int. Cl.
*E02F 3/24* (2006.01)
*E02F 3/26* (2006.01)

(58) Field of Classification Search
CPC .. E02F 5/08; E02F 9/202; E02D 17/13; F16H 57/0441; F16H 57/0404; F16H 57/0436; F16H 57/031; F04D 29/181
See application file for complete search history.

(56) References Cited

FOREIGN PATENT DOCUMENTS

| | | |
|---|---|---|
| DE | 9107187 | 9/1991 |
| EP | 0518293 | 12/1992 |
| EP | 1529924 | 5/2005 |
| EP | 2667036 | 3/2015 |
| EP | 1666671 | 11/2015 |
| JP | H04-097019 | 3/1992 |
| JP | H08 270007 | 10/1996 |
| JP | 3096842 U | 1/2004 |
| JP | 2008-031837 | 2/2008 |
| JP | 2008-240511 | 10/2008 |
| WO | WO 2020/173788 | 9/2020 |

* cited by examiner

DRIVE DEVICE FOR A DIAPHRAGM WALL CUTTER

CROSS-REFERENCE TO RELATED APPLICATIONS

This application is a continuation of International Patent Application Number PCT/EP2020/054358 filed Feb. 19, 2020, which claims priority to German Patent Application Numbers DE 20 2019 101 110.6 filed Feb. 27, 2019 and DE 20 2019 102 477.1 filed May 2, 2019, all of which are incorporated herein by reference in their entireties.

BACKGROUND

The present invention relates to a drive device for a slurry wall cutter having a drive case and/or transmission case that surrounds an inner space for receiving drive and/or transmission elements and that comprises two case parts that are rotatable relative to one another and that are sealed with respect to one another by a sealing device and having a pressure equalization device for pressure equalization between the inner space and the environment. The invention further relates to a slurry wall cutter having such a drive device.

Slurry wall cutters are as a rule used in special civil engineering to cut trenches in the soil, rock, or subsoil that are filled with a suspension comprising, for example, concrete to form a slurry wall. Such slurry walls are here generally wall constructions in the subsoil composed of e.g. concrete, reinforced concrete, and the like to seal the subsoil, to support it, or to generally influence it in a specific manner. To produce such a slurry wall, a substantially perpendicular trench that is open to the top is cut using a slurry wall cutter, with the cutting tool being lowered into the soil from above and being guided by a support unit, such as a crawler excavator that is supported on the ground and that is preferably travelable. The slurry wall cutter here typically comprises an elongate, upright cutting frame that is vertically travelably suspended at the support unit and that typically supports a plurality of cutting wheels at its lower end that can be drivable in opposite directions about respective horizontal axes. The drive for the rotary driving of the cutting wheels can likewise be supported at a lower section of the cutting frame and can, for example, comprise one or more hydraulic motors that can drive the cutting wheel via a gear stage.

The removed soil material can be pumped to the earth's surface by means of a removal pump, while the trench is constantly stabilized by a support suspension so that the trench or the trench walls do not collapse. After reaching the required depth, the trench is then concreted over as a rule. Due to the depth, that can be considerable in some cases and that can also reach magnitudes of more than 100 m or 150 m, the support suspension causes a considerable pressure that can amount to magnitudes of 10 bar or also of multiples of 10 bar, for example 20 bar. The bentonite frequently used for the support suspension has a density, for example, in the range from 1.0 to 1.3 t/m$^3$, which results in said considerable pressures.

The sealing of the drive device represents a great challenge here since sealing has to take place not only against a contaminated environment and abrasive media contained therein, but also additionally against the increased considerable external pressure due to the depth. This external pressure results in problems in the sealing of the drive from a certain pressure level onward, with dirt and water in particular being able to penetrate into the interior of the drive case and/or transmission case.

To combat this problem, it has already been proposed to bring about a pressure equalization between the inner case space and the environment. Document DE 21 62 314 A, for example, proposes a rotary cultivating machine in which the drive case has a pressure equalization device in the form of a rotatable membrane or of a displaceable piston to equalize the inner pressure in the case to the outer pressure. The pressure equalization that can hereby be brought about is limited, however, or this pressure equalization device is not suitable for the huge pressures with slurry walls having today's drilling depths.

Document EP 1 529 924 B1 proposes a slurry wall cutter in which the total inner space of the transmission case is to have pressure applied to equalize the interior space pressure in the transmission case to the environmental pressure. However, losses occur in the transmission here or complex, bulky pressure accumulators or pressure pumps are required to be able to provide the required pressure volume. If the pressure in the interior space is produced by application of compressed air or compressed gas, large amounts of compressed air or compressed gas are required if the transmission case is only filled with lubricating oil up to approximately half in the usual manner since then the other half of the inner transmission case has to be filled with compressed air. If, for example, an inner space pressure of 2 bar should be produced by compressed air, around 20 times the volume of compressed air to be filled is required. This compressed air or the compressed gas has to be stored in a kind of balloon or pressure container in the slurry wall cutter or alternatively has to be introduced into the transmission by means of a compressor via a pressure line. Both are complex and bulky due to the required volume.

It has already been considered to this extent to approximately completely fill the inner space of the transmission with lubricating oil to make the remaining air space as small as possible by volume. The required volume of the pressure medium is minimized due to the incompressibility of the lubricating oil. However, such an approximately complete filling with lubricating oil brings about the considerable disadvantage that much greater churning losses occur that greatly increase due to the rotating gears, bearings, and seals with a completely filled transmission case and result in poor efficiency and accordingly also in increased temperature problems.

Document EP 1 666 671 B1 furthermore describes a slurry wall cutter in which the roller element bearing of the cutting wheel carrier is sealed by two sealing elements. To supply the sealing elements with lubricant and to flush them, so-to-say, lubricant can be supplied to the seals via an inflow opening and can be led off again via an outlet opening. Even though a certain extension of the service life can hereby be achieved, the previously described problems at high pressure differences remain present.

It is therefore the underlying object of the present invention to provide an improved drive device and an improved slurry wall cutter of the initially named kind which avoid disadvantages of the prior art and further develop the latter in an advantageous manner. A reliable sealing of the inner case space should in particular also be achieved at very high pressure differences such as occur at great slurry wall depths without obtaining this by high churn losses or voluminous compressed gas devices.

SUMMARY

In accordance with the invention, said object is achieved by a drive device in accordance with claim 1 and by a slurry wall cutter in accordance with claim 24. Preferred embodiments of the invention are the subject of the dependent claims.

It is therefore proposed not to apply pressure to the whole inner space of the case, but only to an intermediate space connected upstream toward the environment and to seal it toward the inner space, on the one hand, and toward the environment, on the other hand. In accordance with the invention, the pressure equalization device comprises at least one intermediate chamber that has pressure applied from a pressure source and that is sealed toward the inner space by an inner seal and toward the environment by an outer seal. The pressure application for the pressure equalization between the inner space and the environment is considerably simpler due to such a sealed intermediate chamber between the inner case space and the environment that can be considerably smaller than the inner space by volume. In particular no large-volume pressure accumulators or pressure pumps are required since the pressure equalizing volume is considerably smaller than on a pressure application on the whole inner space. At the same time, the outer and inner seals can be adapted to their purposes by the pressure equalization that takes place.

Said inner and outer seals that seal the intermediate space against the inner space of the drive case and/or transmission case, on the one hand, and against the environment, on the other hand, can in particular be configured in the form of different seal types to meet the demands of the different strains at the outer and inner sides of the intermediate chamber. Environment here means the outwardly disposed space surrounding the slurry wall cutter, in particular the slurry trench filled with a suspension.

The outer seal for sealing the intermediate chamber toward the environment can in particular be adapted to also withstand high mechanical strains through dirt and abrasive media, with the seal only having to withstand limited pressures since only limited pressure differences occur due to the pressure equalization toward the environment. On the other hand, the inner seal for sealing the intermediate chamber with respect to the inner case space can be adapted to seal high pressures, with the seal here only having to have limited ability to withstand abrasive media and dirt.

The outer seal can in particular comprise a metal face seal that has a high wear resistance to rough and abrasive external media. Such a metal face seal can in particular comprise two hard material sealing rings that slide off on one another and can be supported by at least one elastic and/or elastomeric seal at a sealing case. The hard material sealing rings can in particular be two metal sealing rings that are mounted in two separate case parts and are pressed toward one another, with, for example, lapped or otherwise finely worked running surfaces of the hard material sealing rings being able to slide off on one another tensioned against one another. The elastic and/or elastomeric sealing ring can, for example, be an O ring that centers the hard material sealing rings in the seal case or can also be an elastomeric ring having a cross-section different from a circular shape. In this respect, two 0 rings or elastomeric rings can also be used to seal the two hard material sealing rings with respect to the case parts.

The inner seal for sealing the intermediate chamber toward the inner case space can advantageously be an elastomeric sealing ring that can be received in a sealing groove to withstand high pressure differences.

The inner and/or outer seals are advantageously formed as dust-tight and/or fluid-tight and/or gas-tight, preferably also at pressure or pressure differences of several bar or multiple 10 bars.

Two or more than two intermediate chambers can advantageously also be provided that are arranged between the inner space of the drive case and/or transmission case and the environment and can here be connected after one another so that the interface between the two case parts rotatable with respect to one another passes through the plurality of intermediate chambers or is sealed. To move from the environment to the inner space of the case, each of the plurality of intermediate chambers has to be passed through one after the other.

In this respect, each of said intermediate chambers can respectively be sealed toward the inner space by an inner seal and toward the environment by an outer seal, with the inner and outer seals of at least one or of each intermediate chamber being able to be formed differently in the aforesaid manner. To the extent that said intermediate chambers are arranged connected after one another, said outer seals do not have to directly seal toward the environment and the inner seals do not have to directly seal toward the inner space since a respective further outwardly disposed intermediate chamber or a further inwardly disposed intermediate chamber can be interposed. The inner seal of an outer intermediate chamber, for example, seals toward an inner intermediate chamber, while the outer seal of an inner intermediate chamber seals toward a further outwardly disposed intermediate chamber. The outer seals nevertheless seal at least indirectly toward the environment and the inner seals seal at least indirectly toward the inner space.

In an advantageous further development of the invention, the at least one intermediate chamber can be configured as an annular chamber that extends concentrically around the axis of rotation about which the two case parts are rotatable with respect to one another.

Depending on the configuration and arrangement of the interface between the two rotatable case parts, the at least one intermediate chamber can be arranged at an end face or at a peripheral face of the drive case and/or transmission case. The intermediate chamber can in particular extend about the outer jacket surface of one of the case parts, with the intermediate chamber being able to form an annular chamber extending peripherally.

If the two case parts are supported rotatably with respect to one another by a roller element bearing or a plain bearing, said intermediate chamber can advantageously extend adjacent, in particular offset in the direction of the axis of rotation from the roller element bearing or plain bearing, beside said roller element bearing or plain bearing.

In a further development of the invention, the drive case and/or transmission case can be fastened to a bearing shell that can, for example, be fastened to the cutting frame of a slurry wall cutter and/or can support a drive motor, with the drive case and/or transmission case being able to comprise a connection support that projects from the bearing shell in the direction of the axis of rotation, that can be formed in sleeve shape, and that can be closed, in particular engaged around, by a bowl-shaped transmission cover that is rotatably supported relative to said connection support. A roller element bearing and/or plain bearing can, for example be provided, in particular peripherally arranged, between a marginal web of the case cover and the sleeve-shaped connection support for rotational support and/or can be configured as a radial bearing.

The at least one intermediate chamber can here be peripherally arranged between the sleeve-shaped connection support and the marginal web of the bowl shaped case cover and/or adjacent to the bearing shell.

If a plurality of intermediate chambers are provided, the intermediate chambers can be configured as annular chambers having different diameters, with the intermediate chambers being able to be arranged at least partially nested in one another and/or, viewed in the radial direction, overlapping one another. The intermediate chambers can in particular be arranged in a common plane that extends perpendicular to the axis of rotation of the case parts.

The at least one intermediate chamber can advantageously have pressure applied from the pressure source via a compressed fluid channel, which compressed fluid channel can extend at least partially through the aforesaid bearing shell and/or through the aforesaid connection support.

If a plurality of intermediate chambers are provided, it can be advantageous to provide separate pressure connections for the different intermediate chambers to be able to apply pressure medium to the intermediate chambers individually and/or independently of one another. Such an independent application of pressure to a plurality of intermediate chambers has the advantage that on wear of the seals of a chamber or on a leak of an intermediate chamber, a pressure equalization can still take place via the other intermediate chamber and the system remains functional.

In order not to have to provide any large pressure accumulators or bulky, large-volume pressure pumps, the at least one intermediate chamber can have a volume that is very small in comparison with the inner space of the case. In a further development of the invention, the intermediate chamber can have a volume that is less than 10%, or also less than 5%, of the volume of the inner space.

The pressure level in the at least one intermediate chamber can advantageously be variably controlled. A control device for the control of the chamber pressure provided by the pressure source in the at least one intermediate chamber can here work in dependence on the environmental pressure and/or on the cutting depth, for example such that the chamber pressure in the intermediate chamber is increased as the outer or environmental pressure increases and/or as the cutting depth increases to keep the pressure difference limited at the outer seal or between the environment and the intermediate chamber.

In an advantageous further development of the invention, the chamber pressure in the at least one intermediate chamber can be monitored by means of a pressure monitoring device to be able to detect a leak of the intermediate chamber and/or an unwanted pressure drop and thus a defective pressure equalization. A display device can advantageously display when the chamber pressure is outside a predetermined rage in dependence on a signal of the pressure monitoring device. Alternatively or additionally, a time progression of the chamber pressure can also be determined to be able to determine, for example, a gradual pressure drop or a gradual failure due to wear of the seals. If, for example, a continuously slight pressure drop is adopted, a maintenance signal or a pressure drop signal can be output to recognize wear early.

The monitoring device can advantageously also have a lubricant level sensor system to detect the lubricant level in the drive case and/or transmission case to be able to detect an increase of the lubricant level in the inner space of the case. Such an increase of the lubricant level can be used, in particular in connection with a pressure drop signal that indicates a pressure drop in the intermediate chamber, to determine whether the leak occurs in the interior of the case and closes the inner seal of the intermediate chamber.

In an advantageous further development of the invention, the at least one intermediate chamber can be connected to a flushing circuit through which a flushing fluid, in particular flushing oil, can be flushed through the intermediate chamber. The intermediate chamber can be connected to a flushing fluid inlet and to a flushing fluid outlet for this purpose, with the inlet and the outlet advantageously being able to be connected in an adjacent manner to the same section of the intermediate chamber or at oppositely disposed chamber sections, for example both on the upper side or on oppositely disposed middle sections of the peripheral annular channel to ensure that the flushing fluid is flushed through the total intermediate chamber. The intermediate chamber can be cleansed by a flushing thereof and abrasive particles can be flushed out that have moved over the outer seal into the intermediate chamber. Said flushing system can here have a filter that filters the flushing fluid or particles contained therein.

In an advantageous further development of the invention, a flushing control can be provided that can cyclically flush the at least one intermediate chamber at intervals predetermined in time and/or in dependence on the operating time and/or in dependence on the revolutions of the case.

The case parts can have different functions depending on the configuration of the drive device and/or of the drive train. In an advantageous further development of the invention, the inner space that is surrounded by the case parts can receive at least one planetary gear stage. If such a planetary gear stage is provided in the inner case space, one of the two case parts can be rotationally fixedly connected to the sun gear and/or to the planetary carrier, while the other case part can serve as an annulus gear or can be rotationally fixedly connected to the annulus gear.

Independently of the configuration of the transmission, one of the case parts can form a rotatingly drivable output element to which a cutting wheel of the slurry wall cutter is fastenable to rotarily drive the cutting wheel.

BRIEF DESCRIPTION OF THE DRAWINGS

The invention will be explained in more detail in the following with respect to preferred embodiments and to associated drawings. There are shown in the drawings.

DETAILED DESCRIPTION

Figure 1:
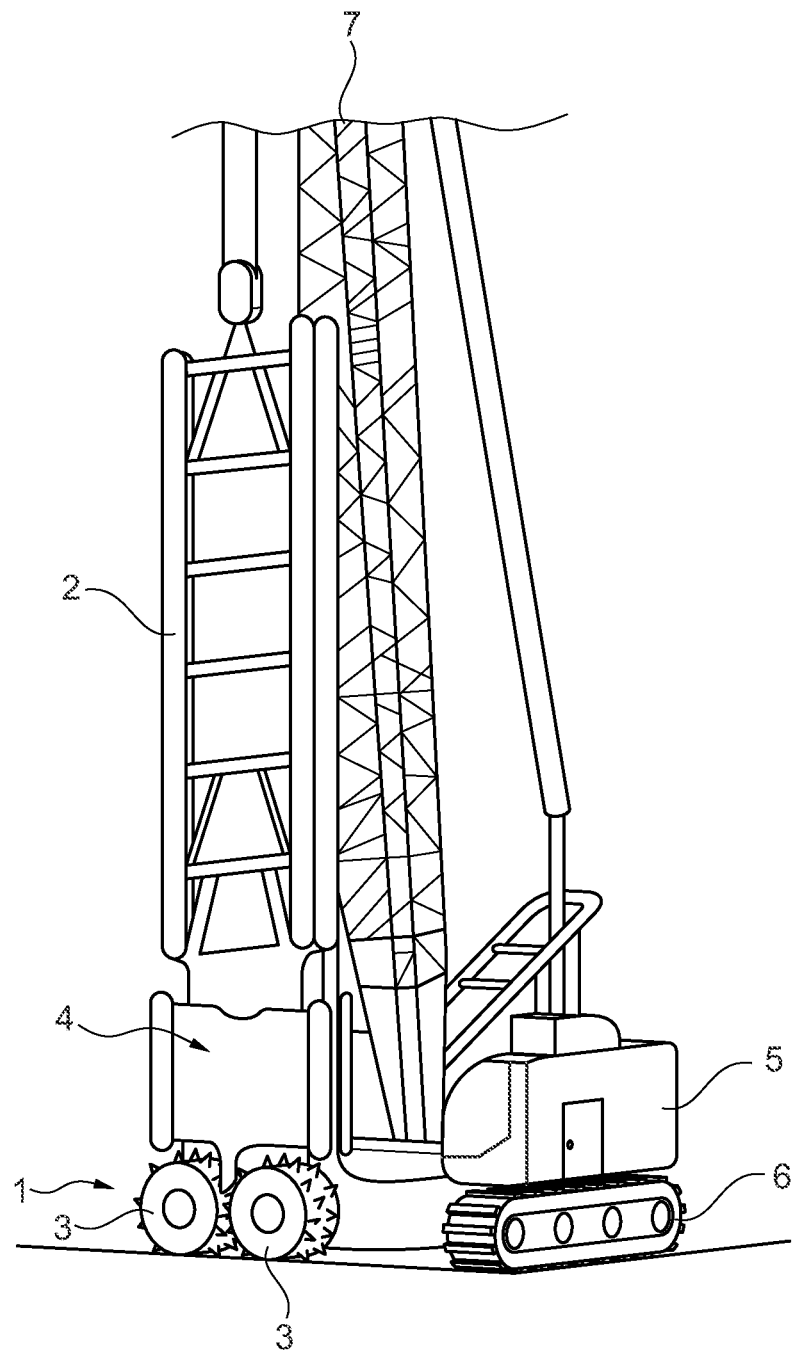
FIG. 1: a schematic, perspective representation of a slurry wall cutter in accordance with an advantageous embodiment of the invention.
Figure 2:
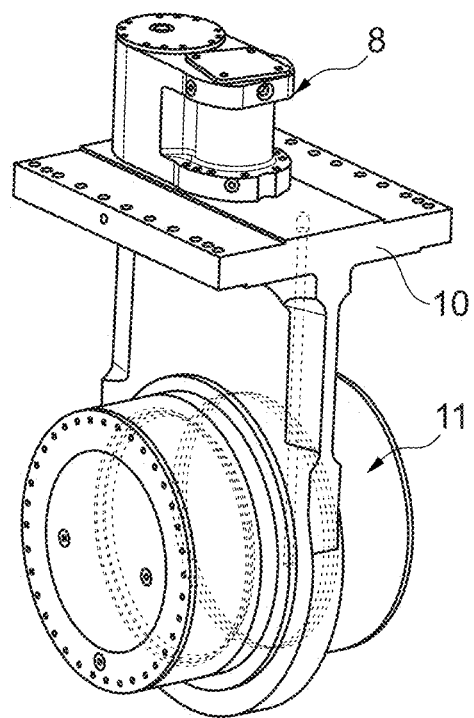
FIG. 2: a perspective view of the drive device for the cutting wheels of the slurry wall cutter of FIG. 1, with the drive motor being supported at an upper section of a bearing shell of the drive motor and with the transmission case to which the cutting wheels of the slurry wall cutter of FIG. 1 are fastened being arranged at a lower section of the bearing shell.

As FIG. 1 shows, the slurry wall cutter 1 can have an elongate cutting frame 2 arranged as upright that can be configured as a lattice carrier and/or can comprise two laterally arranged longitudinal guide sections. The cutting frame 2 can have at least two cutting wheels 3 at a lower end section, said cutting wheels 3 being arranged next to one another and being able to be rotarily drivable about respective horizontal axes of rotation, with the axes of rotation of the cutting wheels 3 being able to extend in parallel with one another and/or perpendicular to the flat side of the cutting frame 2.

The two cutting wheels 3 can here be drivable oppositely to one another. A cutting drive 4 can be arranged above the cutting wheels 3 at a lower end section of the cutting frame 2 and can, for example, comprise one or more drive motors 8 (e.g., FIG. 3) that can drive said cutting wheels 3 via one or more transmission stages 9 (e.g., FIG. 3).

As FIG. 1 shows, the cutting frame 2 with the cutting wheels 3 can be held raisably and lowerably by a support unit 5 or can be suspended thereat. Said carrier support unit 5 stands on the ground in which the respective trench should be cut and can advantageously be travelable. A cable excavator having a chassis, for example in the form of a tracked chassis 6, can in particular be provided as the support unit 5, with the cutting frame 2 being able to be raised and lowered by a boom 7 of the support unit 5.

As FIGS. 2 to 5 show, the drive device 4 can be arranged at a bearing shell 10 or can comprise such a bearing shell 10 by which the drive device can be fastenable to said cutting frame 2. Said bearing shell 10 can, for example, be a T-shaped beam whose upper section can be fastened to the cutting frame 2 and can support a drive case and/or transmission case 11 at its lower section in which said transmission stage 9 is at least partially received.

The drive motor 8 can, for example, be fastened to the upper end of the bearing shell 10 and can be drivingly coupled to the transmission stage 9 via a drive shaft 12 that can extend in the interior of the bearing shell 10. Said transmission stage 9 can here comprise one or more planetary transmission stages to drive one of said cutting wheels 3.

The transmission case 11 here comprises two mutually rotatable case parts 13 and 14 that are sealed toward the environment by a sealing device 15 and that surround an inner space 16 in which the transmission stage 9 is received. Said inner space 16 can be configured as at least approximately cylindrical and can extend along the axis of rotation 17 of the two case parts 13 and 14, cf. FIG. 3.

Figure 3:
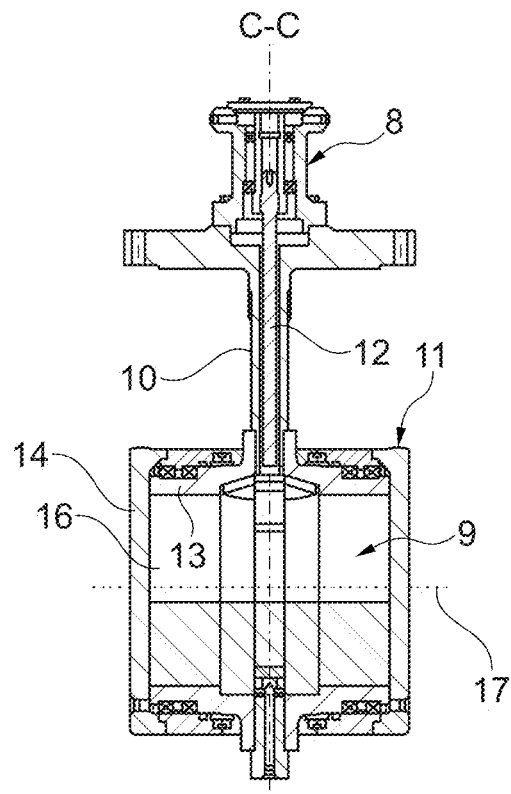
FIG. 3: a cross-section through the drive device of FIG. 2 that shows the two case parts of the transmission case that are rotatable with respect to one another and the intermediate chamber for the pressure equalization.

One of the case parts 13 can advantageously be configured as a sleeve-shaped connection support that can be rigidly connected to the bearing shell 10 and that extends therefrom projecting in the direction of the axis of rotation 17 toward oppositely disposed sides, cf. FIG. 3. The other case part 14 can be configured as a bowl shaped case cover that closes the connection support 13 at the end face and whose peripheral marginal web engages around it. A pivot bearing 18, for example in the form of a one-row or multirow roller element bearing supports the second case part 14 rotatably at the first case part 13, cf. FIGS. 3 and 5.

The interface or the seal gap between the two case parts 13 and 14 can run through said pivot bearing 18 and can extend along the peripheral side of the sleeve-shaped connection support and at its end face between the two case pars 13 and 14, cf. FIG. 3.

A pressure equalization device comprises an intermediate chamber 20 that can have pressure applied, that is arranged between the inner space 16 and the environment, that forms a part of the seal gap or of the interface between the two case parts 13 and 14, and that seals the inner space 16 with respect to the outer environment.

As FIGS. 2 to 5 show, the sleeve-shaped case part 13 is closed at oppositely disposed end faces by a respective case cover 14 so that two sealing gaps and correspondingly two intermediate chambers 20 are provided. The extent to which the two intermediate chambers 20 are similar will only describe one of the two in the following.

Figure 5:
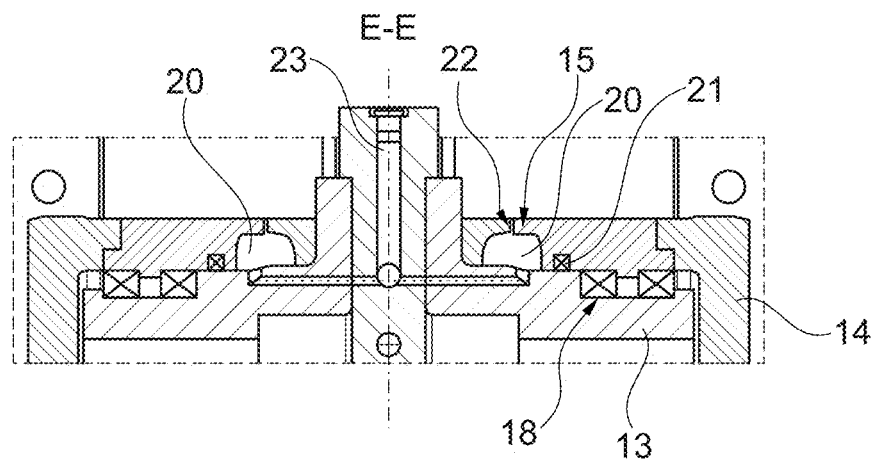
FIG. 5: a sectional view along the line E-E in FIG. 4 that shows the arrangement of the intermediate chambers between the case parts and their pressure application via the pressure channels.

As FIG. 5 shows, said intermediate chamber 20 is configured in the form of an annular chamber that extends concentrically to the axis of rotation 17 and extends peripherally between the two case parts 13 and 14. The intermediate chamber 20 in particular extends along the outer periphery of the case part 13 configured as a connection support and/or along the bearing shell 10, with the intermediate chamber 20 being able to be arranged between the pivot bearing 18 and the bearing shell 10.

As FIG. 5 further shows, the intermediate chamber 20 is sealed with respect to the inner space 16 by an inner seal 21 and with respect to the environment by an outer seal 22. The inner and outer seals 21 and 22 can be configured differently from one another, with the outer seal 22 advantageously being able to be configured in the form of a metal face seal. Independently of this, the inner seal 21 can be configured in the form of an elastomeric seal, for example in the form of a sealing ring that can be received in a groove-like sealing cutout to seal the interface between the two case parts 13 and 14. Said sealing groove in which the elastomeric inner seal 21 is received can extend in the peripheral direction or be formed at the inner periphery of the case part 14 and/or at the outer periphery of the case part 13 so that the inner seal 21 seals the peripheral interface between the two case parts 13 and 14.

The outer seal 22 configured as a metal face seal can in particular comprise two metal or hard material sealing rings whose lapped or otherwise finely worked running surfaces, in particular end faces at the axis side, can, for example, be pressed toward one another and can run off on one another. The two metal sealing rings can each be supported at the seal case by an O ring or by an elastomeric ring and/or can be sealed with respect to one another so that the one metal sealing ring is arranged at the stationary seal case part and the other metal sealing ring is arranged at the rotating seal case part, cf. FIG. 5.

The intermediate chamber 20 can have pressure fluid, for example pressure oil, applied via a pressure fluid channel 23 from a pressure source 24, with said pressure medium channel 23 advantageously being able to extend through the non-rotating case part 12. Said pressure medium channel 23 can in particular extend through the bearing shell 10 and through the case part 13 configured as a connection support to communicate with the intermediate chamber 20. The opening of the pressure medium channel 23 at the bearing shell 10 can be configured as a pressure fluid connection.

To be able to flush the intermediate chamber 20 with pressure medium, two pressure medium channels 23 can also communicate with the intermediate chamber 20, advantageously arranged at oppositely disposed sides, or can communicate with oppositely disposed sectors of the intermediate chamber 20. One of the pressure medium channels 23 here serves as an inflow and the other as an outflow to be able to flush the pressure medium through the intermediate chamber 20 and to be able to hereby flush out contaminants.

Figure 4:
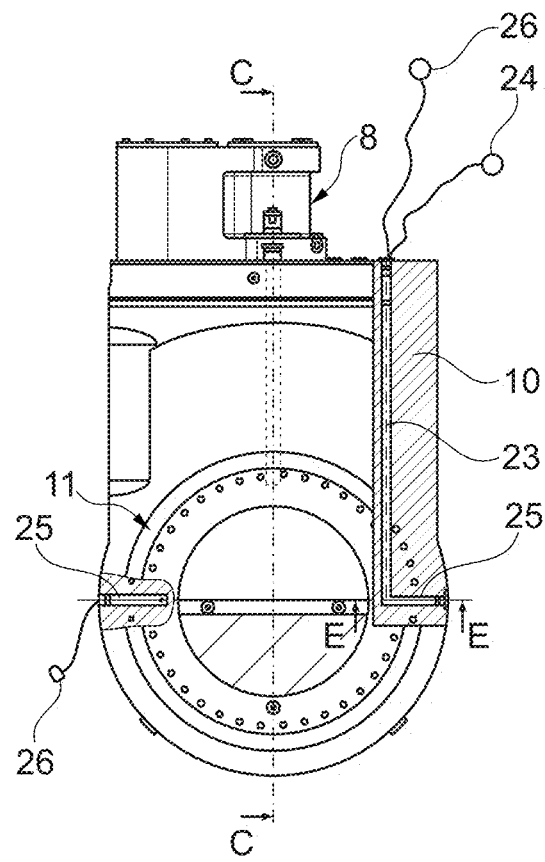
FIG. 4: a partially sectioned side view of the drive device of FIGS. 2 and 3 that shows the pressure channels for the pressure application to the intermediate chambers.

The additional lateral pressure medium channels 25 to be seen in FIG. 4 can serve as a service connection, for example to be able to supply the flushing medium during flushing and to be able to allow it to flow off. In this respect, a pressure monitoring device 26 can, however, also be connected via such a pressure medium channel 25 to be able to monitor the chamber pressure in the intermediate chamber 20, as already initially explained.

The pressure monitoring device can advantageously, alternatively or additionally, however, also be connected via the previously named pressure medium channel 23, whereby a simple assembly can be achieved.

Figure 6:
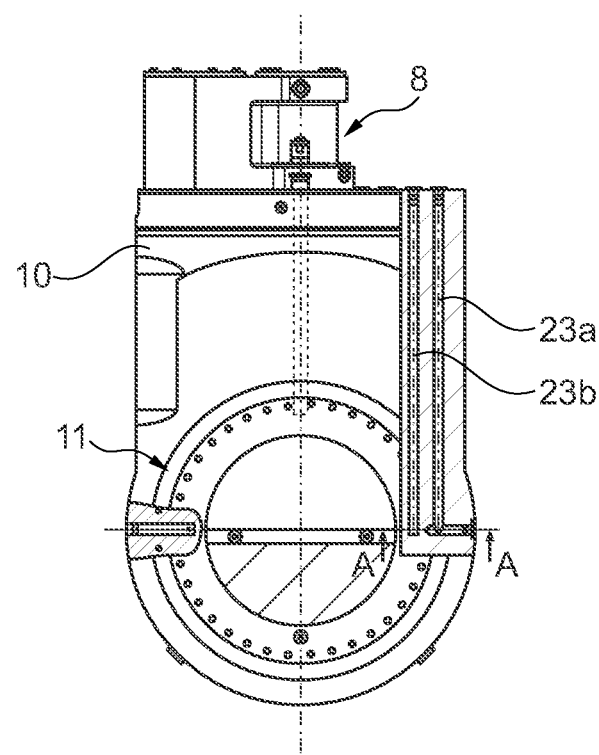
FIG. 6: a side view of a drive device in accordance with a further advantageous embodiment of the invention in a representation similar to FIG. 6, with separate pressure channels for the independent application on a plurality of intermediate chambers being shown.
Figure 7:
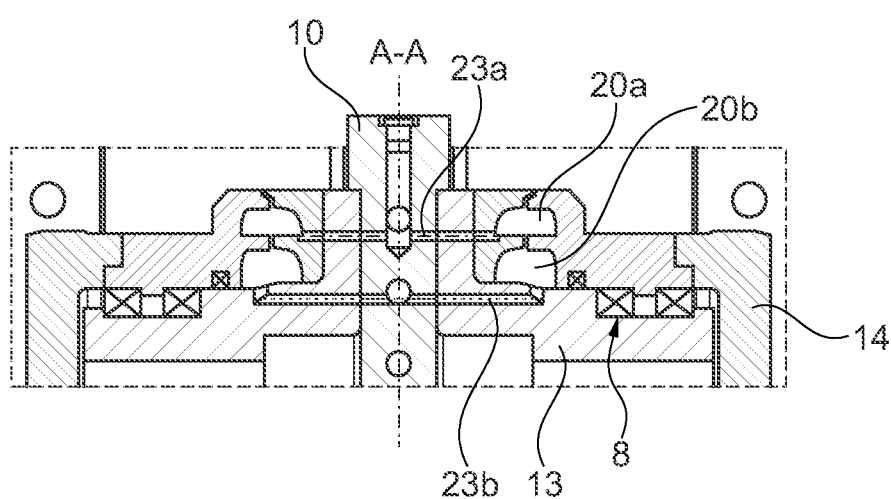
FIG. 7: a sectional view along the line A-A in FIG. 6 that shows the arrangement of the plurality of intermediate chambers connected after one another and their individual pressure supply.

As FIGS. 6 and 7 show, two or optionally more than two intermediate chambers 20a and 20b can be associated with an interface or with the sealing ball between two case parts 13 and 14, with said intermediate chambers 20a and 20b being connected after one another so that lubricant that wants to move outwardly out of the inner space 16 would have to force its way through both intermediate chambers 20a and 20b or, conversely, dirt would have to pass through both intermediate chambers 20a and 20b from the environment to move into the inner space 16.

As FIG. 7 shows, the two intermediate chambers 20a and 20b can each be configured as annular chambers and can have different diameters so that the two intermediate chambers 20 can advantageously be arranged nested in one another. The two intermediate chambers 20a and 20b can in particular be arranged in a common plane that extends perpendicular to the axis of rotation 17 and/or can cover one another viewed in the radial direction.

The plurality of intermediate chambers 20a and 20b can advantageously have pressure applied on them independently of one another. For this purpose, each intermediate chamber 20a and 20b can communicate with its own pressure medium channel 23a and 23b, which pressure medium channels 23a and 23b can form two separate pressure connections, cf. FIG. 6. On a pressure drop in one intermediate chamber, the pressure equalization can still be ensured via the other chamber due to the independent application of pressure.

We claim:

1. A drive device for a slurry wall cutter in an environment comprising:
    a drive case and transmission case that surrounds an inner space for receiving drive and transmission elements and that comprises two case parts, wherein the two case parts are rotatable relative to one another, wherein the two case parts are sealed with respect to one another by a seal device;
    a pressure equalization device for the pressure equalization between the inner space and the environment, wherein the pressure equalization device has at least one intermediate chamber, wherein the intermediate chamber has pressure applied from a pressure source, and wherein the intermediate chamber is sealed with respect to the inner space by an inner seal and with respect to the environment by an outer seal.

2. The drive device of claim 1, wherein the inner and outer seals are configured in the form of mutually different seal types.

3. The drive device of claim 2, wherein the outer seal is a dirt-resistant seal designed for relatively low pressure differences and the inner seal is a gas-tight and fluid-tight high pressure seal.

4. The drive device of claim 1, wherein the outer seal has a metal face seal, with the metal seal comprising two hard material sealing rings that slide off on one another and are supported by a respective elastic and elastomeric sealing ring at a rotating or non-rotating sealing case part.

5. The drive device of claim 1, wherein the inner seal has an elastomeric and elastic sealing ring that is arranged in a sealing groove in one of the case parts.

6. The drive device of claim 1, wherein the at least one intermediate chamber has an annular chamber that extends concentrically around an axis of rotation about which the two case parts are rotatable with respect to one another.

7. The drive device of claim 1, wherein the intermediate chamber extends around an outer jacket surface of one of the case parts.

8. The drive device of claim 1, wherein the at least one intermediate chamber has a volume that amounts to less than 10% of the volume of the inner space of the drive case and transmission case.

9. The drive device of claim 1, wherein the at least one intermediate chamber extends between a pivot bearing by which the two case parts are rotatably supported at one another and a bearing shell to which the drive case and transmission case is fastened.

10. The drive device of claim 9, wherein the intermediate chamber is sealed with respect to the pivot bearing by the inner seal.

11. The drive device of claim 1, wherein one of the two case parts forms a rotatingly drivable output element that has a releasable fastener for fastening a cutting wheel of the slurry wall cutter.

12. The drive device of claim 1, wherein one or more planetary gear stages are received in the inner space, with one of the two case parts rotationally fixedly connected to an annulus gear of the one or more planetary gear stages and with the other case part being rotationally fixedly connected to a sun gear or to a planetary carrier of the one or more planetary gear stages.

13. The drive device of claim 1, wherein one of the case parts forms a cylindrical case sleeve and the other case part forms a bowl-shaped case cover that surrounds the case sleeve at an end face and engages around the case sleeve peripherally or covers the case sleeve peripherally.

14. The drive device of claim 13, wherein the at least one intermediate chamber is in a region of the peripheral covering of the case cover and of the case sleeve.

15. The drive device of claim 1, further comprising a control device for an automatic control of the chamber pressure provided by the pressure source in the intermediate chamber in dependence on the environmental pressure and on a cutting depth.

16. The drive device of claim 1, further comprising a flushing device for a flushing through of the at least one intermediate chamber with a flushing agent, wherein the flushing agent comprises a flushing oil, and wherein the flushing device comprising an inflow communicating with the intermediate chamber and an outflow communicating with the intermediate chamber to supply and discharge the flushing agent.

17. The drive device of claim 1, further comprising a pressure monitoring device for monitoring the chamber pressure present in the intermediate chamber.

18. The drive device of claim 17, wherein the pressure monitoring device comprises a pressure loss determiner for determining a predetermined pressure drop and for determining a pressure progression over time and a display device for displaying a maintenance signal on a predetermined pressure drop or a predetermined pressure progression.

19. The drive device of claim 1, wherein an inner space is filled with a lubricant having a lubricant level amount, and wherein the lubricant level amount is between 10% and 65% of the inner space volume.

20. The drive device of claim 19, further comprising a level monitoring device for monitoring the lubricant level in the inner space, wherein a display device for displaying a maintenance signal is configured to emit a wear signal for a wear of the inner seal when a predetermined pressure drop or a predetermined pressure progression of the chamber pressure in the intermediate chamber is accompanied by an increase in the lubricant level of the inner space.

21. The drive device of claim 18, further comprising a level monitoring device for monitoring the lubricant level in the inner space, wherein the display device for displaying a maintenance signal is configured to emit a wear signal for a wear of the inner seal when a predetermined pressure drop or a predetermined pressure progression of the chamber pressure in the intermediate chamber is accompanied by an increase in the lubricant level of the inner space.

22. The drive device of claim 1, further comprising a plurality of intermediate chambers associated with a same seal gap between the two case parts.

23. The drive device of claim 22, wherein the plurality of intermediate chambers have pressure applied independently of one another.

24. The drive device of claim 23, wherein the plurality of intermediate chambers are connected to one another.

25. The drive device of claim 22, wherein the plurality of intermediate chambers are connected to one another.

26. A slurry wall cutter having at least one cutting wheel rotatably supported at a cutting frame and rotary drivable by a drive device, wherein the drive device is configured in accordance with claim 1.

* * * * *